United States Patent [19]

Kanemaru et al.

[11] Patent Number: 4,723,810
[45] Date of Patent: Feb. 9, 1988

[54] UNDERBODY STRUCTURE FOR VEHICLE

[75] Inventors: Yukihiro Kanemaru; Akiyoshi Okada; Hideaki Akahosi; Kenzou Kihara; Yoshinobu Nomura; Hiroshi Tazaki, all of Hiroshima, Japan

[73] Assignee: Mazda Motor Corporation, Japan

[21] Appl. No.: 744,275

[22] Filed: Jun. 13, 1985

[30] Foreign Application Priority Data

Jun. 18, 1984 [JP] Japan ................... 59-124848
Jun. 18, 1984 [JP] Japan ................... 59-124850
Jun. 18, 1984 [JP] Japan ................... 59-90536[U]
Jun. 26, 1984 [JP] Japan ................... 59-95453[U]

[51] Int. Cl.⁴ .......................................... B65D 25/20
[52] U.S. Cl. ................... 296/185; 296/194; 296/204; 280/5 A
[58] Field of Search ............... 296/185, 194, 203, 204; 280/5 A, 5 R; 220/1 V

[56] References Cited

U.S. PATENT DOCUMENTS

| | | | |
|---|---|---|---|
| 1,158,602 | 11/1915 | Watts et al. | 280/5 A |
| 1,419,896 | 6/1922 | Page | 280/5 A |
| 1,504,751 | 8/1924 | Green | 280/5 A |
| 1,629,493 | 5/1927 | Ford | 280/5 A |
| 2,812,030 | 11/1957 | Boehner | 280/5 A X |
| 3,661,419 | 5/1972 | Mitamura et al. | 280/5 A X |
| 4,369,981 | 1/1983 | Chiba et al. | 280/5 A |
| 4,416,461 | 11/1983 | Hayashi et al. | 280/5 A |
| 4,444,373 | 4/1984 | Hayashi | 280/5 A X |
| 4,511,176 | 4/1985 | Watanabe et al. | 296/204 |
| 4,514,008 | 4/1985 | Watanabe et al. | 296/204 |
| 4,545,589 | 10/1985 | Watanabe et al. | 280/5 A |

FOREIGN PATENT DOCUMENTS 57-201722 12/1982 Japan.
57-205225 12/1982 Japan.
57-201776 12/1982 Japan.
58-49521 3/1983 Japan.

Primary Examiner—Robert B. Reeves
Assistant Examiner—Russell D. Stormer
Attorney, Agent, or Firm—Michael P. Hoffman; Gerald J. Ferguson, Jr.; Michael J. Foycik, Jr.

[57] ABSTRACT

In an underbody structure for a rear-engine rear-drive car or a midship-engine rear-drive car, a dash panel for separating the passenger compartment from a trunk formed at the front of the body is provided with a concave portion projecting into the passenger compartment in the lower portion of the dash panel substantially at the center thereof and the fuel tank is disposed partly in the concave portion and partly in the trunk.

16 Claims, 11 Drawing Figures

UNDERBODY STRUCTURE FOR VEHICLE

BACKGROUND OF THE INVENTION

1. Field of the Invention

This invention relates to an underbody structure for a vehicle, and more particularly to an underbody structure for mounting a fuel tank for a vehicle in which the fuel tank is disposed at the rear thereof.

2. Description of the Prior Art

In rear-engine rear-drive (RR) vehicles and midshipengine rear-drive (MR) vehicles, location of the fuel tank has been a difficult and important problem. For example, when the fuel tank is located between the engine and the passenger compartment, the size of the passenger compartment is decreased by the space taken up by the fuel tank and fuel in the fuel tank is apt to foam due to heat from the engine and cause detonation of the engine during motion. On the other hand, when the fuel tank is located at the front of the vehicle body or in the side sills, there arises a problem with safety that if the vehicle has a head-on or side collision, the fuel tank is liable to be broken.

In Japanese Unexamined Patent Publication No. 57(1982)-201722, to locate the fuel tank in RR type cars or MR type cars, it is proposed to utilize the tunnel portion which extends longitudinally in the center of the floor in front-engine rear-drive (FR) type cars to house a propeller shaft but is not necessary in RR type or MR type cars having no propeller shaft like that of the FR type car. This arrangement is advantageous in that the fuel tank can be disposed in the center of the vehicle body in which there is less possibility of breakage of the fuel tank upon collision. However, the arrangement cannot be considered to be optimal from the viewpoint of the space in the passenger compartment since the tunnel portion projects into the passenger compartment to reduce the space therein. Especially in small cars, the influence of the tunnel portion on the space in the passenger compartment is significant.

SUMMARY OF THE INVENTION

In view of the foregoing observations and description, the primary object of the present invention is to provide an underbody structure useful especially for a RR type or MR type car which enables the fuel tank to be located away from the engine and near the center of the body without significantly reducing the space in the passenger compartment.

In accordance with the underbody structure of the present invention, a dash panel for separating the passenger compartment from a trunk formed at the front of the body is provided with a concave portion projecting into the passenger compartment in the lower portion of the dash panel substantially at the center thereof and the fuel tank is disposed partly in the concave portion and partly in the trunk.

In a preferred embodiment of the present invention, a floor panel which forms the floor of said passenger compartment is connected to the lower edge of the dash panel, and the lower surface of the front edge portion of the floor panel is provided with a reinforcement member which surrounds at least the rear portion of the fuel tank and extends in the transverse direction of the vehicle body at the end portions to form a closed section structure.

In accordance with another preferred embodiment of the present invention, the reinforcement member is connected to a cross member provided in front of the fuel tank to extend in the transverse direction of the vehicle body by way of a frame member extending in the longitudinal direction of the vehicle body.

In a still another preferred embodiment of the present invention, an upper reinforcement member is fixed to the front surface of the dash panel to extend in the transverse direction of the vehicle body along the upper edge of the concave portion, and said fuel tank is supported by a lower band fixed to the reinforcement member at the rear end and extending forward along the lower surface of the fuel tank, and an upper band which is hinged to a cross member mounted on the front face of the dash panel, extends forward from the cross member along the upper surface of the fuel tank and downward along the front surface of the same, and is connected with the lower band at the intersection of the front surface and the lower surface of the fuel tank by a fastener.

DESCRIPTION OF THE PREFERRED EMBODIMENTS

Figure 1:
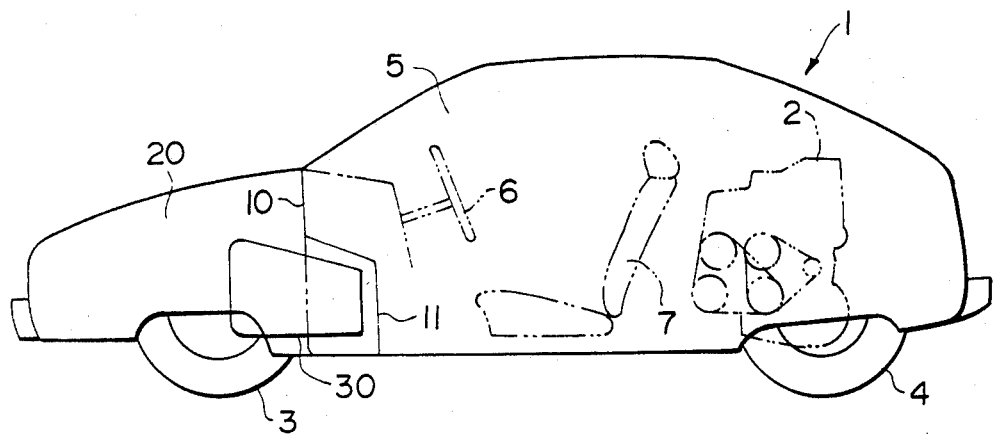
FIG. 1 is a schematic side view of a rear-engine rear-drive car having an underbody structure in accordance with a first embodiment of the present invention.

In FIG. 1, a RR type car 1 in which is incorporated an underbody structure in accordance with an embodiment of the present invention has an engine 2 disposed in the rear of the vehicle body. The output of the engine 2 is transmitted to rear wheels 4 to drive them. In front of the engine 2 is formed a passenger compartment 5 in which a steering wheel 6, seats 7 and the like are disposed. A trunk 20 is formed in front of the passenger compartment 5 and is separated from the passenger compartment 5 by a dash panel 10. A concave portion 11 concave toward the passenger compartment 5 is formed in the lower portion of the dash panel 10 substantially at the center as seen in the transverse direction of the vehicle body. A fuel tank 30 is disposed partly in the concave portion 11 and partly in the trunk 20.

Figure 4:
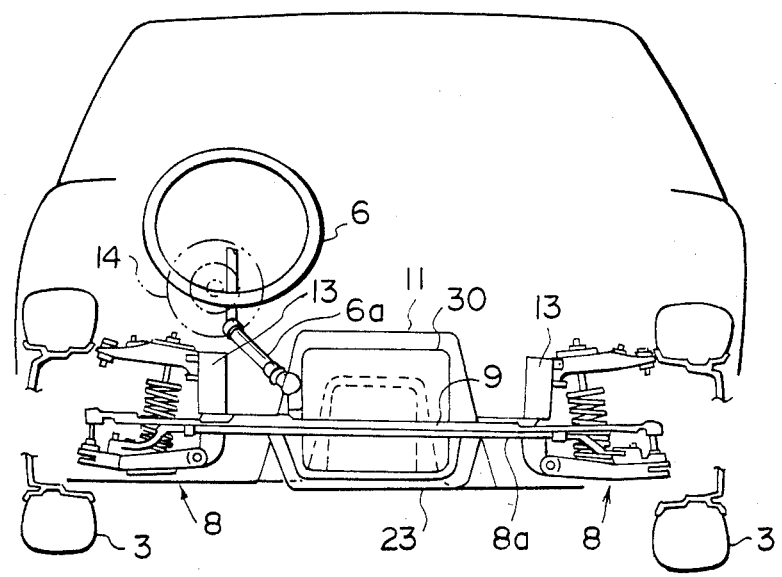
FIG. 4 is a schematic view as seen from the front of the car shown in FIG. 1 showing the inner structure of the same.
Figure 5:
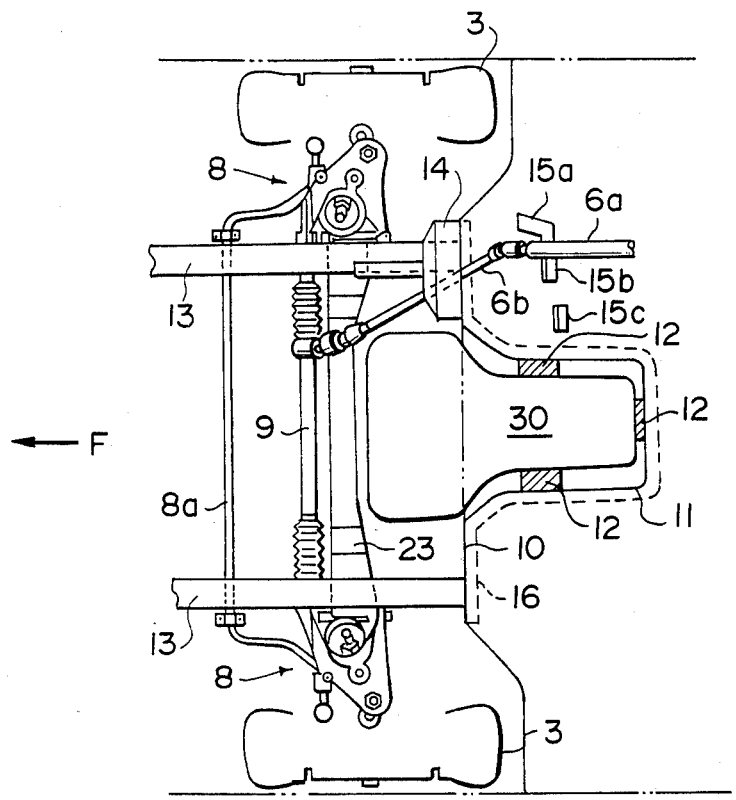
FIG. 5 is a schematic view as seen from above the car shown in FIG. 1 showing the inner structure of the same.

The concave portion 11 is positioned beside the clutch pedal 15c as shown in FIG. 5 (reference numerals 15a and 15b in FIG. 5 respectively denote the acceleration pedal and the brake pedal) where it is generally covered with a console (not shown). Therefore, the concave portion 11 projecting into the passenger compartment 5 at the location little affects the effective space in the passenger compartment 5. A cross member 23 extends in the transverse direction of the vehicle body in front of the fuel tank 30. The cross member 23 is connected at each end to frames 13. Further, the cross member 23 is curved downward substantially at the central portion thereof to extend below the horizontal plane which includes the lower surface of the fuel tank 30, in front of the fuel tank 30 as shown in FIG. 4 so that the cross member 23 will not strike the fuel tank 30 when the cross member 23 is pushed rearward by a head-on collision.

Figure 2:
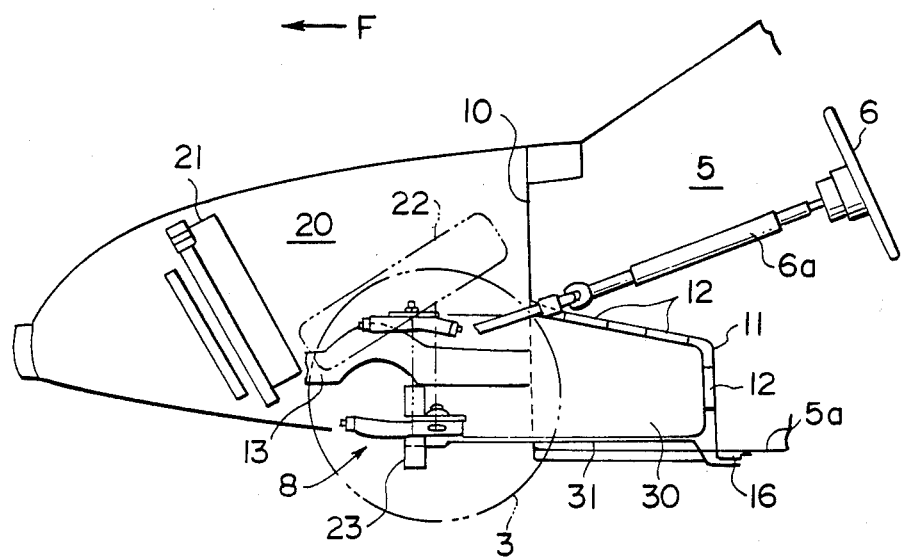
FIG. 2 is an enlarged view as seen from the side showing the inner structure of a part of the car shown in FIG. 1.
Figure 6:
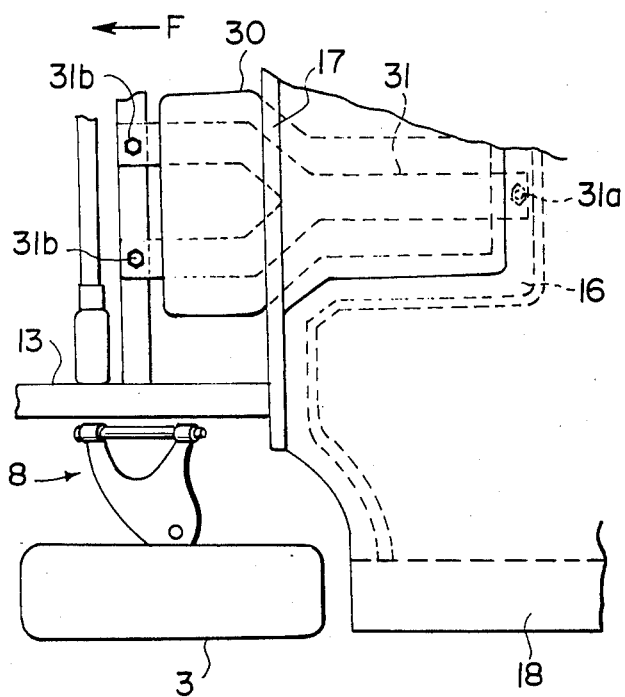
FIG. 6 is an enlarged view showing in more detail a part of FIG. 5.

The lower portion of the dash panel 10 defining the lower edge of the concave portion 11 is connected to a floor panel 5a (FIGS. 2 and 3) of the passenger compartment 5, and a reinforcement member 16 is mounted along the junction therebetween to enhance the strength and the rigidity. The reinforcement member 16 extends along the rear half of the fuel tank 30 with the end portions thereof extending in the transverse direction of the vehicle body. The end portions of the reinforcement member 16 may be connected to the right and left side sills 18 (FIG. 6). As can be seen from FIGS. 2 and 3, the lower surface of the reinforcement member 16 is disposed below the lower surface of the fuel tank 30 to protect the fuel tank 30 from obstructions on the road. A Y-shaped tank band 31 for supporting the fuel tank 30 extends between the rearwardly projecting portion of the reinforcement member 16 and the cross member 23 and is fixed thereto by bolts 31a and 31b. A plurality of cushioning materials 12 are disposed between the outer surface of the fuel tank 30 and the inner surface of the concave portion 11 to assist in supporting the fuel tank 30 and to attenuate the transmission of vibrations to the fuel tank 30.

Right and left front wheels 3 are supported by right and left suspensions 8 and are turned in response to operation of the steering wheel 6 which is disposed in the passenger compartment 5 and connected to the front wheels 3 by way of steering shafts 6a and 6b and a steering mechanism 9.

Figure 3:
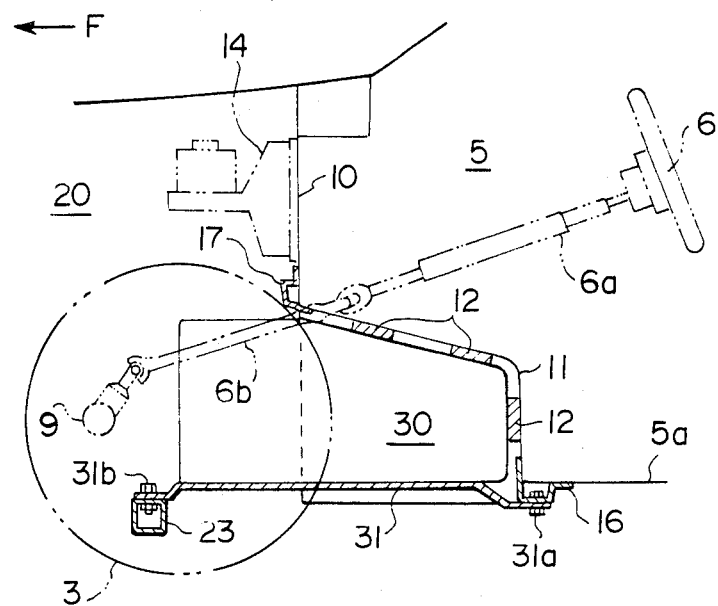
FIG. 3 is a further enlarged view showing the inner structure of a part of the car shown in FIG. 1.

A spare tire 22 (FIG. 2) is provided in the trunk 20 and a radiator 21 is mounted in front of the trunk 20. A master cylinder 14 for a brake system is mounted on the trunk side of the dash panel 10 (FIG. 3). Reference numeral 8a in FIGS. 4 and 5 denotes a stabilizer. Further, a second reinforcement member 17 is mounted on the front face of the dash panel 10 to extend in the transverse direction of the vehicle body along the upper edge of the concave portion 11.

Figure 7:
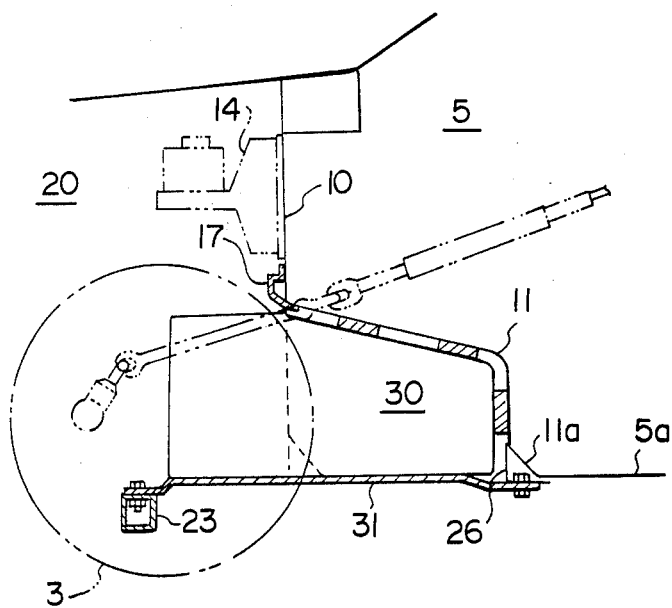
FIG. 7 is a view similar to FIG. 3 but showing an underbody structure in accordance with a second embodiment of the present invention.

FIG. 7 shows a modification of the underbody structure shown in FIGS. 1 to 6. In this modification, the lower end portion 11a of the concave portion 11 is inclined downward and rearward in the passenger compartment 5 and is connected to the floor panel 5a. Instead of the reinforcement member 16 in the embodiment above, a reinforcement member 26 which forms a closed triangle in cross section with the lower end portion 11a is mounted on the lower surface of the floor panel 5a to enhance rigidity of the portion supporting the fuel tank 30. Also in this modification, it is preferred that the lower surface of the reinforcement member 26 be below the lower surface of the fuel tank 30 in order to protect the fuel tank 30 from obstructions on the road.

Figure 8:
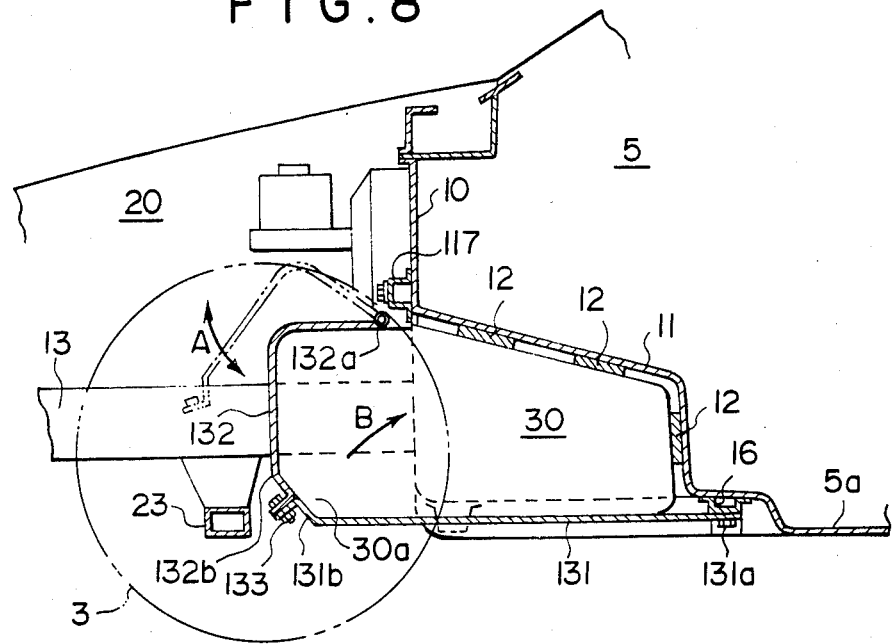
FIG. 8 is a view similar to FIG. 3 but showing an underbody structure in accordance with a third embodiment of the present invention.
Figure 9:
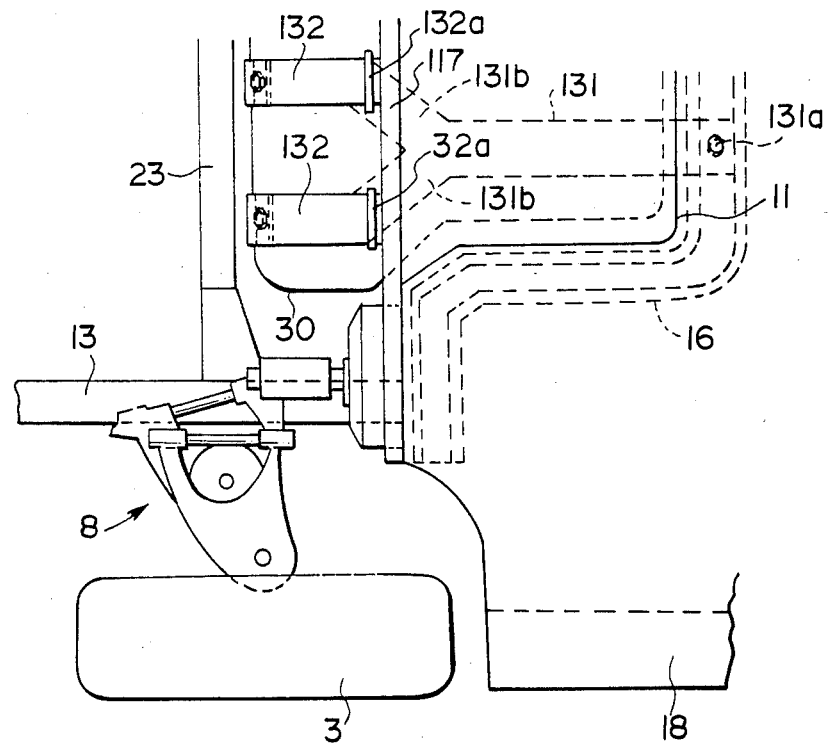
FIG. 9 is a view similar to FIG. 6 but showing a part of the underbody structure of the third embodiment.

FIGS. 8 and 9 show another embodiment of the present invention. The underbody structure in accordance with this embodiment is very similar to that of the first embodiment except that the structure for supporting the fuel tank 30 differs from that in the first embodiment. Therefore, the parts corresponding to the parts of the first embodiment are given the same reference numerals as in FIGS. 1 to 6. The structure for supporting the fuel tank 30 in this embodiment will now be described, hereinbelow. In this embodiment, the fuel tank 30 is supported by a pair of upper bands 132 and a lower band 131. Said lower band 131 is Y-shaped or bifurcated at the front end portion to form a pair of front arms 131b. The rear end portion of the lower band 131 is fixed to the central portion of the reinforcement member 16 projecting rearward by a bolt 131a. The lower band 131 extends along the lower surface of the fuel tank 30 and the fronts arms 131b are secured to the upper band 132 by fasteners 133 at a front lower edge 30a of the fuel tank 30 which is beveled. The upper band 132 are connected, at the upper end, by hinges 132a to a second cross member 117 which is mounted on the front face of the dash panel 10 at the upper edge of the concave portion 11 to extend in the transverse direction of the vehicle body. The upper bands 132 extend along the front half of the upper surface of the fuel tank 30 and along the front surface of the same, and then are connected to the front arms 131b of the lower band 131 at lower ends 132b by the fasteners 133. The lower band 131 and the upper band 132 press the fuel tank 30 toward the cushionings 12 to firmly support the fuel tank 30. When the fasteners 133 are fastened, the fuel tank 30 is urged rearward upward, whereby play in the longitudinal direction of the vehicle body and the vertical direction due to dimensional discrepancies in the production of the fuel tank 30, the concave portion 11, the upper band 132, the lower band 131 and the like can be eliminated.

Figure 10:
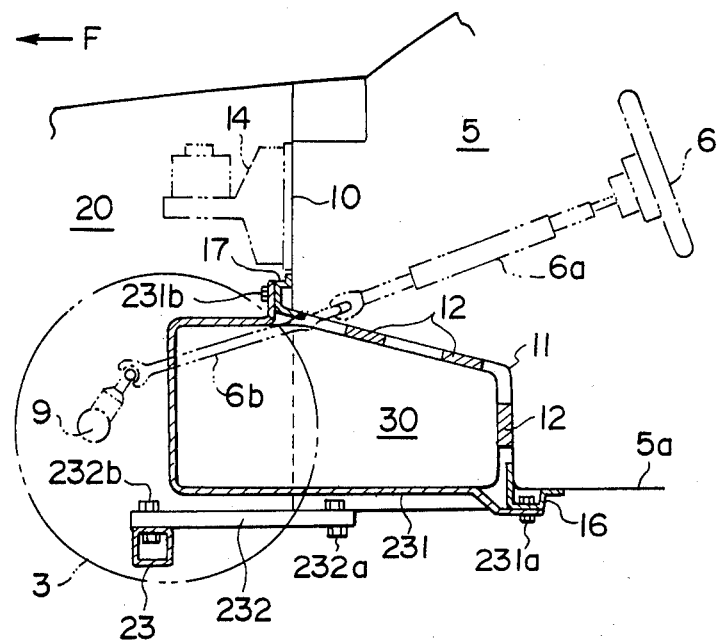
FIG. 10 is a view similar to FIG. 3 but showing an underbody structure in accordance with a fourth embodiment of the present invention.
Figure 11:
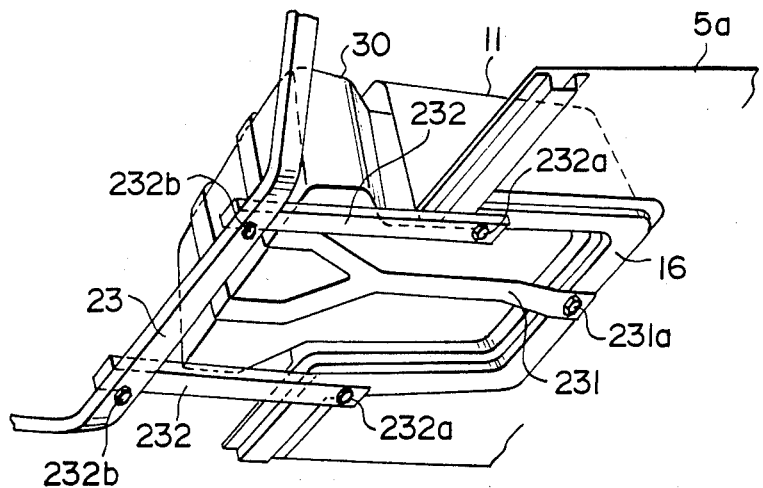
FIG. 11 is a perspective view showing a part of the underbody structure of the fourth embodiment as viewed from below the vehicle body.

FIGS. 10 and 11 show another embodiment of the present invention. The underbody structure in accordance with this embodiment is very similar to that of the first embodiment except that the structure for supporting the fuel tank 30 differs from that in the first embodiment. Therefore, the parts corresponding to the parts of the first embodiment are given the same reference numerals as in FIGS. 1 to 6. The structure for supporting the fuel tank 30 in this embodiment will now be described, hereinbelow.

In this embodiment, the fuel tank 30 is fixedly mounted by a Y-shaped tank band 231 which is fixed to the rearwardly projecting portion of the reinforcement member 16 by a bolt 231a at the rear end and to the second reinforcement member 17 by bolts 231b at the bifurcated front end portion. As clearly shown in FIG. 11, the downwardly curved portion of the cross member 23 and the reinforcement member 16 are connected by a pair of frame members 232 each of which is connected to the reinforcement member 16 by a bolt 232a at the rear end and to the cross member by a bolt 232b at the front end. The frame members 232 prevent the fuel tank 30 from detaching from the vehicle body, such as upon collision, for example, and prevents damage to the fuel tank 30 due to deformation of the parts near it, and at the same time increases the rigidity of the overall vehicle body. Further, the frame members 232 protects the fuel tank 30 from obstructions on the road.

We claim:

1. An underbody structure for a vehicle having a trunk formed at the front of the vehicle body and passenger compartment disposed immediately behind the trunk, comprising a dash panel separating the passenger compartment from the trunk and having (a) a concave portion projecting rearwardly into the passenger compartment from a lower portion of the dash panel and substantially at the center thereof, said concave portion having an upper face, two side faces, a front end and a lower end, said front and lower ends having openings, the front opening having a width which is shorter than the overall width of the vehicle body and (b) transversely extending portions which extend from said two side faces of the concave portion to the two sides of the vehicle to define passenger space at either side of the concave portion;

a fuel tank partly in the concave portion and partly in the trunk;

a floor panel, forming the floor of said passenger compartment, connected to the lower portion of the dash panel, a lower reinforcement member at the lower surface of the front edge portion of the floor panel and surrounding at least the rear portion of the fuel tank and being disposed along the edge of the lower opening of the concave portion, and the ends of which extend in the transverse direction of the vehicle body to form a closed section structure, a support member, for supporting the fuel tank, secured at one end thereof to the lower reinforcement member and to a rigid portion of the vehicle body at the other end;

and wherein the width of the part of the fuel tank which is in the trunk is larger than the width of the part of the fuel tank which is in the concave portion.

2. An underbody structure as defined in claim 1 in which the end portions of said lower reinforcement member extend to respective side sills of the vehicle body and are connected thereto.

3. An underbody structure as defined in claim 1 in which a cross member is provided in front of the fuel tank to extend in the transverse direction of the vehicle body.

4. An underbody structure as defined in claim 3 in which said cross member is curved downward below the horizontal plane which includes the lower surface of the fuel tank substantially at the central portion opposite to the fuel tank.

5. An underbody structure as defined in claim 4 in which said cross member is connected at its ends to a pair of frames extending in the longitudinal direction at opposite sides of the vehicle body.

6. An underbody structure as defined in claim 1 in which said closed section structure is triangular in shape, the lower edge portion of the dash panel defining an oblique side of the triangle and said lower reinforcement member defining the other two sides of the same.

7. An underbody structure as defined in claim 1 including a cross member in front of the fuel tank and extending in the transverse direction of the vehicle body, and wherein said support member comprises a tank band, for supporting the fuel tank, mounted on the lower reinforcement member and the cross member to extend therebetween.

8. An underbody structure as defined in claim 7 in which said lower reinforcement member and the cross member are connected by a frame member extending in the longitudinal direction of the vehicle body.

9. An underbody structure as defined in claim 8 in which said cross member is curved downward below the horizontal plane which includes the lower surface of the fuel tank substantially at the central portion opposite to the fuel tank, and the front end of the frame member is fixed to the curved portion of the cross member.

10. An underbody structure as defined in claim 7 in which a plurality of cushioning members are provided between the inner surface of the concave portion and the outer surface of the fuel tank.

11. An underbody structure as defined in claim 1 including an upper reinforcement member fixed to the front surface of the dash panel to extend in the transverse direction of the vehicle body along the upper edge of the concave portion, and wherein said support member comprises a fuel tank supporting band fixed to the lower reinforcement member at a rear end thereof and extending forward from the lower reinforcement member along the lower surface of the fuel tank, and fixed to the upper reinforcement member.

12. An underbody structure as defined in claim 1 including an upper reinforcement member fixed to the front surface of the dash panel to extend in the transverse direction of the vehicle body along the upper edge of the concave portion, and wherein said support member comprises a lower fuel tank supporting band fixed to the lower reinforcement member at the rear end and extending forward along the lower surface of the fuel tank, an upper tank supporting band hinged to a cross member mounted on the front face of the dash panel and extending forward from the cross member along the upper surface of the fuel tank and downward along the front surface of the same, and a fastener connecting the upper and lower tank supporting band at the intersection of the front surface and the lower surface of the fuel tank.

13. An underbody structure as defined in claim 12 in which said lower band is bifurcated at the front end portion to form a pair of front arms and the front end of each front arm is positioned at the intersection of the front and lower surfaces of the fuel tank, and said upper band comprises a pair of band members each of which is hinged to the cross member at the upper end and is connected to one of the front arms at the lower end by the fastener, said intersection of the front and lower surfaces of the fuel tank being chamfered.

14. An underbody structure for a vehicle having a trunk formed at the front of the vehicle body and passenger compartment disposed immediately behind the trunk, comprising a dash panel separating the passenger compartment from the trunk and having a concave portion projecting rearwardly into the passenger compartment from a lower portion of the dash panel and substantially at the center thereof, said concave portion having a upper face, two side faces, a front end and a lower end, said front and lower ends having openings, the front opening having a width which is shorter than the overall width of the vehicle body;

a fuel tank partly in the concave portion and partly in the trunk;

a floor panel, forming the floor of said passenger compartment, connected to the lower portion of the dash panel, a lower reinforcement member at the lower surface of the front edge portion of the floor panel and surrounding at least the rear portion of the fuel tank and being disposed along the edge of the lower opening of the concave portion, and the ends of which extend in the transverse direction of the vehicle body to form a closed section structure, a support member, for supporting the fuel tank, secured at one end thereof to the lower reinforcement member and to a rigid portion of the vehicle body at the other end;

a cross member in front of the fuel tank and extending in the transverse direction of the vehicle body, and wherein said support member comprises a tank band, for supporting the fuel tank, mounted on the lower reinforcement member and the cross member to extend therebetween.

15. An underbody structure for a vehicle having a trunk formed at the front of the vehicle body and passenger compartment disposed immediately behind the trunk, comprising a dash panel separating the passenger compartment from the trunk and having a concave portion projecting rearwardly into the passenger compartment from a lower portion of the dash panel and substantially at the center thereof, said concave portion having an upper face, two side faces, a front end and a lower end, said front and lower ends having openings, the front opening having a width which is shorter than the overall width of the vehicle body;

a fuel tank partly in the concave portion and partly in the trunk;

a floor panel, forming the floor of said passenger compartment, connected to the lower portion of the dash panel, a lower reinforcement member at the lower surface of the front edge portion of the floor panel and surrounding at least the rear portion of the fuel tank and being disposed along the edge of the lower opening of the concave portion, and the ends of which extend in the transverse direction of the vehicle body to form a closed section structure, a support member, for supporting the fuel tank, secured at one end thereof to the lower reinforcement member and to a rigid portion of the vehicle body at the other end;

an upper reinforcement member fixed to the front surface of the dash panel to extend in the transverse direction of the vehicle body along the upper edge of the concave portion, and wherein said support member comprises a fuel tank supporting band fixed to the lower reinforcement member at a rear end thereof and extending forward from the lower reinforcement member along the lower surface of the fuel tank, and fixed to the upper reinforcement member.

16. An underbody structure for a vehicle having a trunk formed at the front of the vehicle body and passenger compartment disposed immediately behind the trunk, comprising a dash panel separating the passenger compartment from the trunk and having a concave portion projecting rearwardly into the passenger compartment from a lower portion of the dash panel and substantially at the center thereof, said concave portion having an upper face, two side faces, a front end and a lower end, said front and lower ends having openings, the front opening having a width which is shorter than the overall width of the vehicle body;

a fuel tank partly in the concave portion and partly in the trunk;

a floor panel, forming the floor of said passenger compartment, connected to the lower portion of the dash panel, a lower reinforcement member at the lower surface of the front edge portion of the floor panel and surrounding at least the rear portion of the fuel tank and being disposed along the edge of the lower opening of the concave portion, and the ends of which extend in the transverse direction of the vehicle body to form a closed section structure, a support member, for supporting the fuel tank, secured at one end thereof to the lower reinforcement member and to a rigid portion of the vehicle body at the other end;

a cross member fixed to the front surface of the dash panel to extend in the transverse direction of the vehicle body along the upper edge of the concave portion, and wherein said support member comprises a lower fuel tank supporting band fixed to the lower reinforcement member at the rear end and extending forward along the lower surface of the fuel tank, an upper tank supporting band hinged to said cross member mounted on the front face of the dash panel and extending forward from the cross member along the upper surface of the fuel tank and downward along the front surface of the same, and a fastener connecting the upper and lower tank supporting bands at the intersection of the front surface and the lower surface of the fuel tank.

* * * * *